Sept. 8, 1925.

F. A. HOWARD

AIRCRAFT

Filed Jan. 12, 1925

1,552,742

2 Sheets-Sheet 1

Frank A. Howard  Inventor.

By  Attorney.

Sept. 8, 1925.

F. A. HOWARD

AIRCRAFT

Filed Jan. 12, 1925

1,552,742

2 Sheets-Sheet 2

Frank A. Howard, Inventor

Patented Sept. 8, 1925.

1,552,742

UNITED STATES PATENT OFFICE.

FRANK A. HOWARD, OF ELIZABETH, NEW JERSEY, ASSIGNOR TO STANDARD DEVELOPMENT COMPANY, A CORPORATION OF DELAWARE.

AIRCRAFT.

Application filed January 12, 1925. Serial No. 1,845.

Be it known that I, FRANK A. HOWARD, a citizen of the United States, residing at Elizabeth, in the county of Union and State of New Jersey, have invented new and useful Improvements in Aircraft, of which the following is a specification.

My invention relates to improvements in aircraft and will be fully understood from the following specification, taken in connection with the accompanying drawings.

Figure 1:
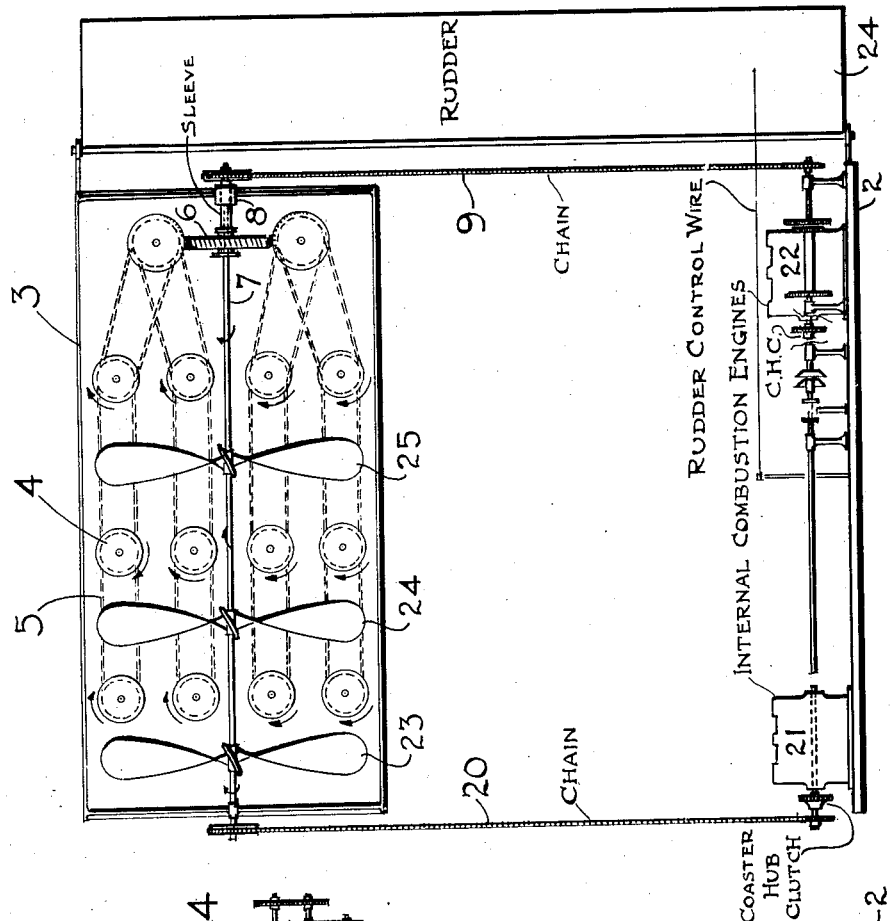
Figure 2:
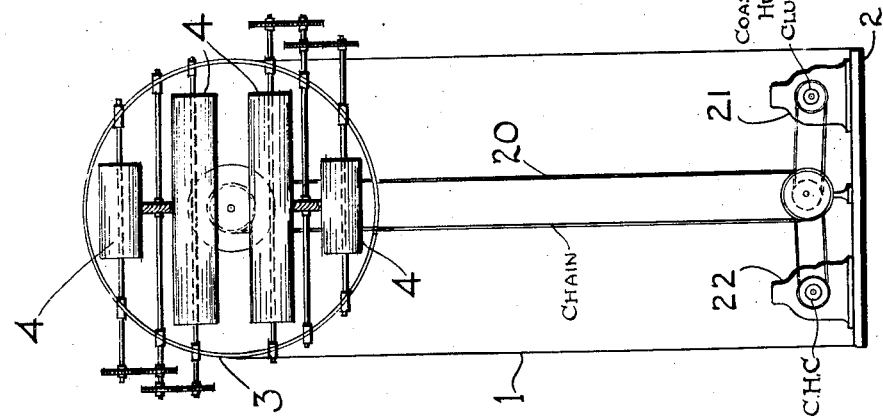
Figure 4:
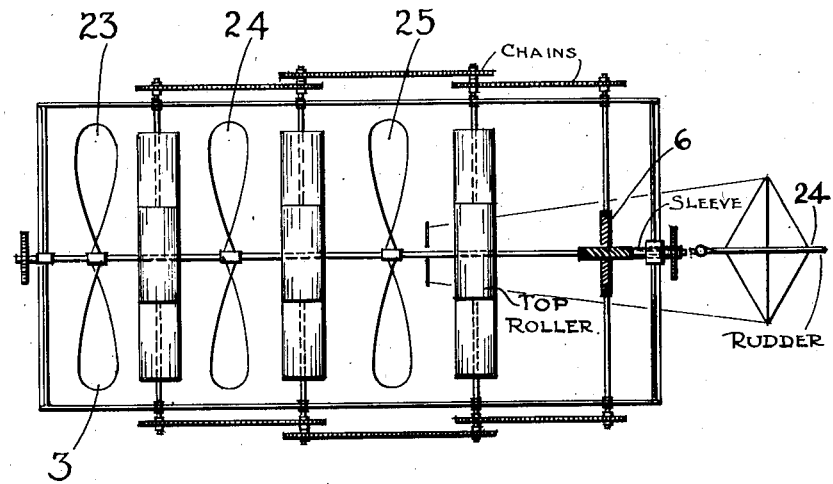
Figure 3:
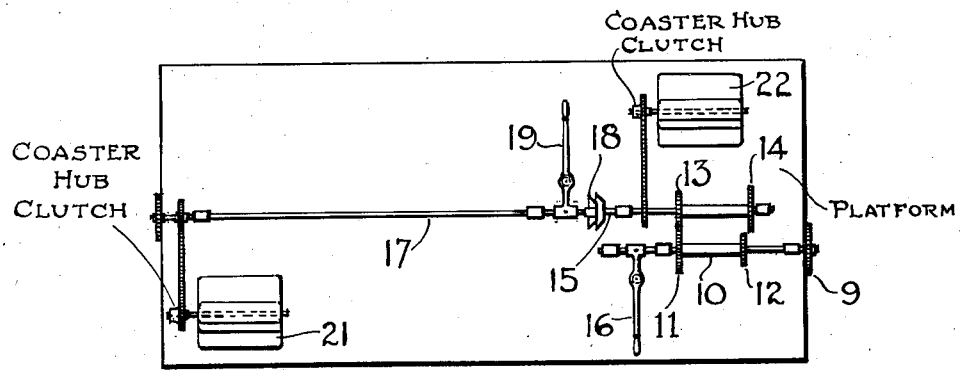

In these drawings, Figure 1 is a diagrammatic side elevation, partly in section, of form of aircraft embodying my invention. Figure 2 is a front elevation. Figure 3 is a plan view of the motor platform. Figure 4 is a plan view of the elevating rolls and propellers.

The type of aircraft herein illustrated and described is the same as that described in my earlier application Serial No. 750,239, filed November 17, 1924.

Referring more particularly to the drawings, the numeral 1 designates a general rectangular frame, having at the base a platform 2, which carries the motors and the useful load of the machine, and in the upper portion a horizontal cylindrical air tunnel 3 rigidly connected to the frame. Journaled on horizontal shafts, which are carried by appropriate structural members forming elements of the surface of the air tunnel 3, are a series of rolls, or drums 4, twelve in number and arranged in three main vertical groups, or stacks, with four drums to each stack. The center drums are of the greatest length, whereas the upper and lower drums are of the least length, the relative proportions being shown in Figure 2.

The shafts of the drums 4 are geared together by the drive chains, or belts 5, so that all drums rotate in the same direction, as indicated by arrows. The driving of the drums is accomplished by means of a gear 6 sleeved over the propeller shaft 7 and mounted in a bearing 8 in the rear of the frame. The gear 6 is driven by the chain 9 from a countershaft 10 located on the load platform. The countershaft 10 is equipped with two driving gears 11 and 12, which may be engaged alternatively with gears 13 and 14 on the rear end 15 of the main drive shaft. Control of the countershaft gear is effected by gear shift lever 16, by which either the gears 11 and 13 or, alternatively, the gears 12 and 14 may be meshed. The front end of the main drive shaft is designated 17 and is capable of connection with the rear end 15 by a clutch 18, manually operable thru a lever 19. The front end of the main drive shaft 17 drives the propeller shaft 7 thru a drive chain 20. The motor platform carries two driving motors, designated 21 and 22, which are of equal size and power. The motor 21 drives thru a chain connection and a coaster hub clutch the front section 17 of the main drive shaft. The motor 22 drives in a similar fashion the rear section 15 of the main drive shaft.

The propeller shaft 7 has three multibladed propellers, designated 23, 24 and 25, keyed thereon. Pivoted on a vertical shaft on the rear of the frame, there is a rudder 24, operable by rudder control wires carried to the load platform.

The entire construction is of the type suitable for aircraft, and illustrated only diagrammatically in the drawing; that is, all parts are constructed of the lightest materials consistent with rigidity and strength.

In the normal operation of the aircraft illustrated and described, the driving motor 21 drives the propeller shaft 7, thus creating a transverse air blast over the surfaces of the horizontal drums 4. When the machine is at rest, this blast, which is confined by the tunnel surface 3 is entirely what might be called a "slip stream," but is nevertheless effective for the purposes of providing an elevating force, as is more fully brought out in my earlier filed application. The drums 4 are rotated in a clockwise direction, as viewed in Figure 1, by power from the motor 22 transmitted thru the rear end section 15 of the main drive shaft, it being understood that under normal conditions the clutch 18 is disengaged. Under these conditions, the relative speeds of rotation of the propellers and drums is capable of independent adjustment thru controlling the speeds of the independent motors 21 and 22.

In the event of a failure of either motor, the clutch lever 19 may be shifted to engage the clutch 18, and, in that event, either motor may drive both the propellers and the drums. A limited independent control of the speeds of the propellers and drums may be effected in this instance by the change-speed gearing, operable thru the lever 16. By virtue of the coaster hub driving clutches thru which the individual motors drive their respective sections of the main shaft, the load of the dead motor is automatically released, so that only the useful driving load needs to be carried by the reserve motor.

The construction and arrangement shown is particularly advantageous in that the maximum independent control of the speeds and power consumption of the propellers and drums is obtainable under ordinary conditions thru direct independent control of the driving motor speeds. Only in the event of emergency due to the failure of one of the driving motors is it necessary to resort to geared control of the relative speeds of the two essential driving and sustaining power means, that is, the propellers 23, 24 and 25, and the drums 4. The air tunnel is of advantage in that the kinetic energy of the slip stream from the propeller 23 passing the first vertical row of drums is to a maximum extent conserved, so that the propeller 24 needs to impart to the moving stream only that proportion of its energy lost in friction and/or reaction with the first row of drums 4.

What I claim is:

1. The improvement in aircraft of the form in which a plurality of longitudinally disposed rotating drums is provided, and means provided for causing an air current to traverse the said drums, which improvement consists in shrouding the drums with a confining surface, by virtue of which the energy content of the air passing the first of the longitudinal series of drums is conserved to the maximum extent for reaction with the succeeding drum.

2. The improvement in that form of aircraft which comprises a rotating horizontal drum, constituting the sustaining surface of the aircraft, and a propeller, constituting the means for securing relative movement of translation between the drum and the air, which improvement consists in providing independent driving motors for the propeller and the drum and mechanical connections between said motors and the respective driving elements by virtue of which either motor may drive both the propeller and the drum.

3. The improvement in the mechanism described in claim 2 which consists in providing means by which the relative speeds of the propeller and drum are susceptible of control in the event both are driven by the same motor.

FRANK A. HOWARD.